United States Patent
Nordenberg

[11] Patent Number: 5,983,930
[45] Date of Patent: *Nov. 16, 1999

[54] AIR SUPPLY VALVE

[75] Inventor: Lennart Nordenberg, Frolunda, Sweden

[73] Assignee: Kvaerner Pulping AB, Karlstad, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/793,503
[22] PCT Filed: Aug. 29, 1995
[86] PCT No.: PCT/SE95/00968
  § 371 Date: Apr. 17, 1997
  § 102(e) Date: Apr. 17, 1997
[87] PCT Pub. No.: WO96/07055
  PCT Pub. Date: Mar. 7, 1996

[30] Foreign Application Priority Data

Sep. 1, 1994 [SE] Sweden .................... 9402922

[51] Int. Cl.⁶ .................................................. F16K 15/00
[52] U.S. Cl. ............................ 137/527.8; 454/259; 137/1
[58] Field of Search .................... 137/527.8, 1; 454/259, 454/353, 359

[56] References Cited

U.S. PATENT DOCUMENTS

| | | |
|---|---|---|
| 718,657 | 1/1903 | Renton .................................. 454/259 |
| 1,263,830 | 4/1918 | Wolf ........................................ 454/259 |
| 1,312,711 | 8/1919 | Vert ..................................... 137/527.8 |
| 1,793,802 | 2/1931 | Hinton ................................ 137/527.8 |
| 2,186,354 | 1/1940 | Whetstine . |
| 2,219,629 | 10/1940 | Lewis .................................. 137/527.8 |
| 4,384,672 | 5/1983 | Kutzner .............................. 137/527.8 |
| 4,494,564 | 1/1985 | Lukacz ............................... 137/527.8 |
| 5,365,975 | 11/1994 | Cote .................................... 137/527.8 |
| 5,383,485 | 1/1995 | Lai ...................................... 137/527.8 |

FOREIGN PATENT DOCUMENTS

| | | |
|---|---|---|
| 31 04474 | 8/1982 | Germany . |
| 28917 | 8/1950 | Sweden . |

*Primary Examiner*—Denise L. Ferensic
*Assistant Examiner*—Ramyar Farid
*Attorney, Agent, or Firm*—Dorsey & Whitney LLP

[57] ABSTRACT

The invention relates to a throttle device for delivery of a current of gas through a channel (1), the device comprising a flap (4) which is arranged so that it can pivot on an axle (5) and which is designed in such a way that, at a certain pressure force exerted by the current of gas, it is opened from a position in which the channel (1) is essentially closed. The invention is characterized in that it comprises at least one weight (7) which is arranged to rotate together with the flap (4) and is designed to deliver a torque to the axle (5) in conjunction with the pivoting of the flap (4). The invention is intended in particular for recovery boilers, or heating boilers or steam boilers for solid fuels. The invention achieves an improved air penetration in respect of air flowing into the boiler.

24 Claims, 2 Drawing Sheets

AIR SUPPLY VALVE

TECHNICAL FIELD

The present invention relates to a throttle device for delivery of a current of gas through a channel, the device comprising a flap which is arranged so that it can pivot on an axle and which is designed in such a way that, at a certain pressure force exerted by the current of gas, it is opened from a position in which the channel is essentially closed.

PRIOR ART

In connection with boilers of various types, for example recovery boilers for use in the production of paper pulp, or heating boilers or steam boilers for solid fuels, such as, for example, bark, peat or coal, it is of great importance that the combustion take place with a uniform and controlled delivery of air and with sustained air penetration, even at partial loads. This leads to an optimized combustion, which results in a high degree of efficiency of the boiler and in a low proportion of environmentally hazardous discharge from the said boiler.

In connection with the delivery of air to boilers, air nozzles of various types are normally used, which air nozzles can consist of flaps which are opened by the pressure force exerted by the current of air. A throttle device for a heating boiler is already known from the document EP 0,022,599, which throttle device comprises a valve flap whose degree of opening can be set with the aid of an adjustable stop screw. This prevents draught from occurring when air is not flowing into the heating boiler. A throttle device for a heating boiler is also already known from FR 1,033,033, which throttle device comprises adjusting members for setting the degree of closure of a pivotably mounted valve flap.

However, a disadvantage of these and other previously disclosed devices is that they do not permit a high penetration of air, that is to say a high degree of penetration of the air upon reduction of the air flow through the nozzle, without a considerable increase in the pressure for this penetration. Good penetration of air is necessary in order to achieve an optimized combustion in the boiler, while at the same time an increased pressure requirement for the combustion air increases the energy consumption in the plant.

DISCLOSURE OF THE INVENTION

A principal object of the present invention is therefore to solve the abovementioned problems and to provide a throttle device with improved air penetration, that is to say with an increased degree of penetration of air which is flowing into the boiler, at the same time as the necessary pressure change for the combustion air is minimized. This is achieved by means of a device of the type mentioned in the introduction, which device is characterized in that it comprises at least one weight which is arranged to rotate together with the flap and is designed to deliver a torque to the axle in conjunction with the pivoting of the flap.

By using such a weight which is arranged on the axle and which assists, on the one hand, in opening the flap, and, on the other hand, in counterbalancing the gravity of the flap when a certain air pressure is present in the channel and the flap is open, an increased and virtually constant velocity of the inflowing air is achieved, and this leads to an improved function and reduced energy consumption of the boiler. In addition, the invention affords the possibility of opening different air nozzles at different air pressures in order to alter the flow pattern in the boiler without recourse to a complicated control system.

DESCRIPTION OF THE FIGURES

The invention will be described in greater detail hereinbelow with reference to the attached figures, of which.

PREFERRED EMBODIMENTS

Figure 1:
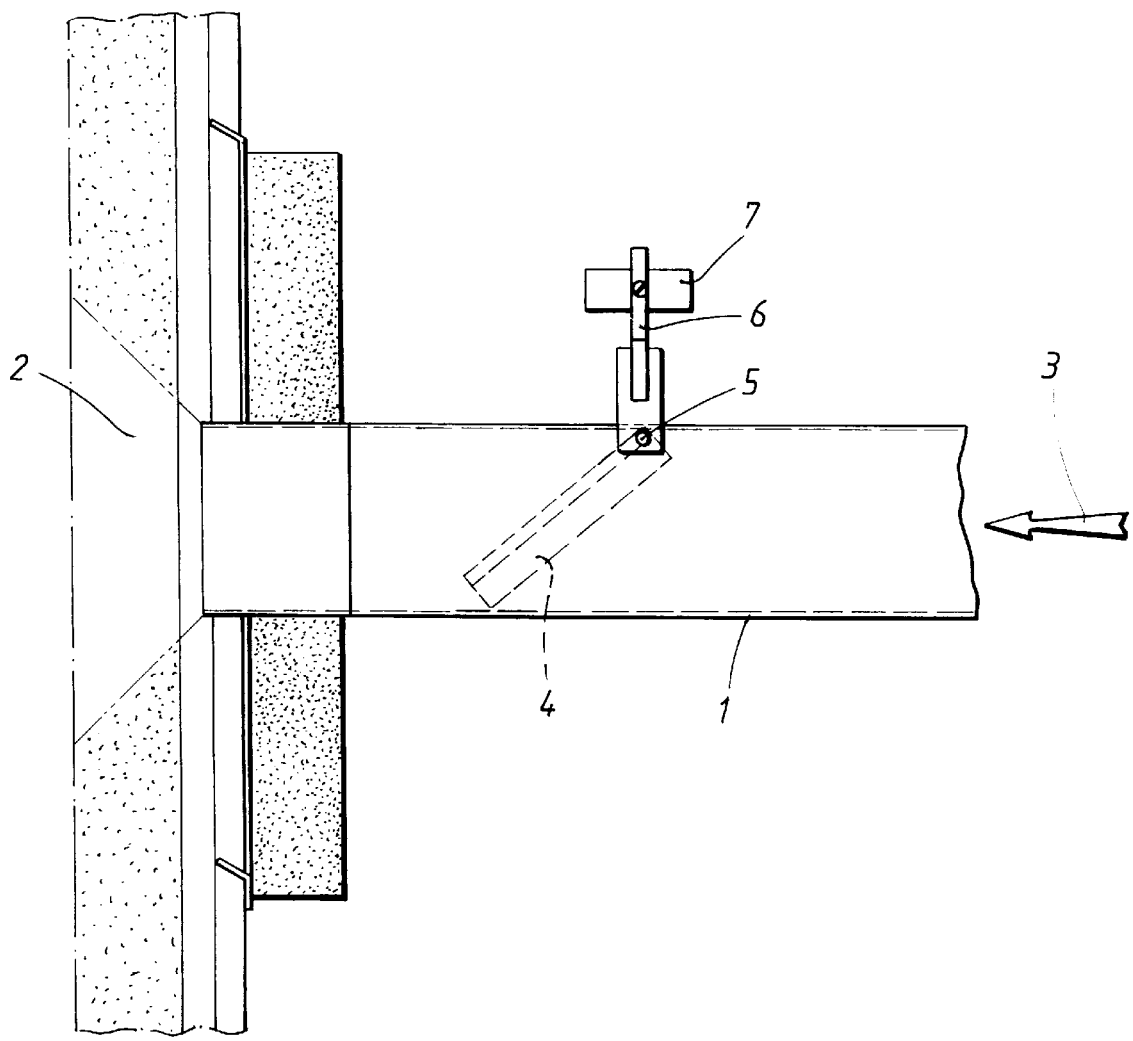
FIG. 1 is a side view of the device according to the present invention.

FIG. 1 shows a throttle device in the form of an air nozzle in accordance with the present invention, which device is arranged in a channel 1 for delivery of air to an inlet 2 of a furnace. The furnace is part of a boiler which is not shown in any detail and which may be a recovery boiler or a bark boiler. The air flows through the channel 1 in the direction which is indicated by the arrow 3.

The channel 1 consists of a pipe which preferably has a rectangular cross section, although some other form of cross section, for example square, is of course also conceivable. Arranged inside the channel 1 there is a valve flap 4, by means of which the channel 1 can be gradually closed or opened. The valve flap 4 consists of a plate which is designed in such a way that its external dimensions essentially correspond to the internal dimensions of the channel 1, except that the length of the flap is normally greater than the height of the channel 1.

When the flap 4 is in its lowered position, which is shown by broken lines in FIG. 1, the channel 1 will be almost closed with the aid of the flap 4. Only a narrow gap between the underside of the flap 4 and the channel 1 is available in this case, and this means that a small amount of air can flow in at all times. This arrangement has a certain cleansing effect on the channel 1 and the boiler.

In its upper portion, the flap 4 is pivotably suspended on an axle 5 which is arranged essentially at right angles to the longitudinal direction of the channel 1. The axle 5 is secured in the two side walls of the channel 1 in such a way that it can rotate, and it protrudes some distance outside the channel 1 on at least one side thereof. A lever arm 6 is arranged on that part of the axle 5 protruding outside the channel 1. The lever arm 6 is provided with a coupling piece which is fixed in terms of rotation on the axle 5. On the lever arm 6 there is also a separate weight 7 which can preferably be displaced along the lever arm 6, that is to say in the radial direction in relation to the axle 5. The position of the weight 7 is adjusted with the aid of an adjusting mechanism (not shown) which can comprise a screw, for example, with the aid of which the weight 7 can be screwed tight against the lever arm 6 when the latter is located in the desired position.

When the throttle device is located in its rest position, that is to say when the air pressure in the channel 1 is below the opening pressure which is defined by the weight 7 or the weight load on the flap 4, the gravity of the flap 4 results in a torque which acts in the counter-clockwise direction around the axle 5. This results in the flap 4 coming to bear (almost sealingly) against the bottom side of the channel 1. In its closed position, the flap 4 forms an angle of preferably 30° to 70° in relation to the longitudinal direction of the channel 1. When a certain air pressure is present in the air current in the channel 1, a pressure force is created which acts on the flap 4, and this gives rise to a certain torque. This leads to the flap 4 pivoting clock-wise. As the flap 4 pivots clockwise, the weight 7 (which is connected to the axle 5 so that it is fixed in terms of rotation) also pivots clockwise. This gives rise to a certain additional torque which acts clockwise, that is to say which, together with the pressure force of the air current, has the effect of opening the flap 4. According to this embodiment, the weight 7 is thus arranged to be rotated together with the axle 5 and to deliver a torque to the axle 5 in conjunction with the pivoting of the flap 4, so that the weight 7 counteracts the dead weight of the flap 4.

The mass of the flap 4 and the mass of the weight 7 are adapted to each other and to the air pressure prevailing in the channel 1 in such a way that the flap 4 and the weight 7 virtually counterbalance each other when the flap 4 is fully open. However, the mass of the flap 4 and the mass of the weight 7 must be adapted so that when the pressure of the air decreases or completely disappears, the torque from the flap 4 overcomes the torque from the weight 7 so that the flap 4 can again be closed.

The position of the weight 7 in relation to the axle 5, and consequently the torque of the weight 7 around the axle 5, can be adapted to different air pressures in the current of air. By virtue of the fact that the weight 7 is arranged outside the channel 1, it is also easy to gain access to it for purposes of adjustment.

The lever arm 6 can alternatively be arranged such that in the rest position (that is to say when the flap 4 is in its lowered position) it deviates from the vertical as shown in FIG. 1. The lever arm 6 can be arranged, for example, in such a way that when the flap 4 is in its rest position, the lever arm produces a torque around the axle 5 which acts in the same direction as the torque which occurs as a result of the pressure force of the air. In this way, a relatively small pressure force of the air current is needed to open the flap 4. The lever arm 6 can also be arranged so that when the flap 4 is in its rest position, the lever arm contributes to the torque acting against the torque from the air current.

Figure 2:
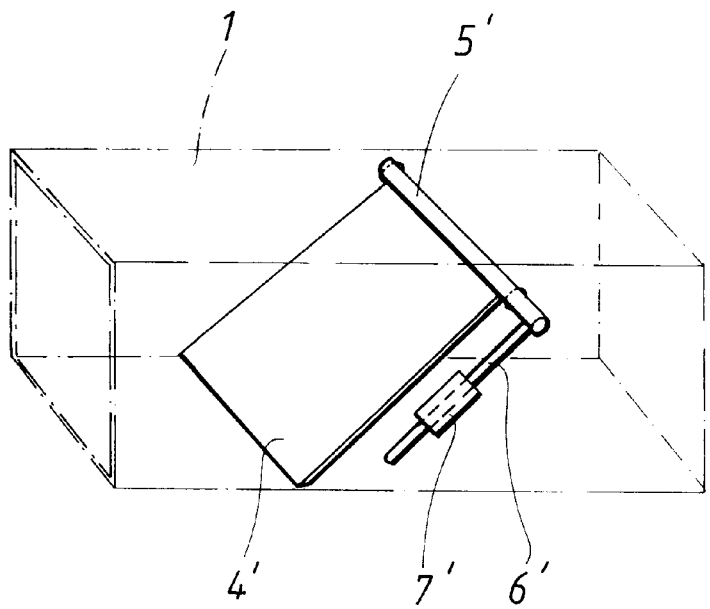
FIG. 2 is a perspective view of an alternative embodiment of the invention.

FIG. 2 shows an alternative embodiment of the invention, which comprises a valve flap 4' which, in analogy with what has been stated above, is pivotably suspended on an axle 5' in a channel 1'. Fixed on the flap 4' there is a lever arm 6' on which a second weight 7' is arranged externally, which second weight 7' can preferably be displaced along the lever arm 6' in the radial direction in relation to the axle 5'. The second weight 7' and the lever arm 6', which are preferably placed outside the channel 1', are arranged in such a way that the second weight 7' cooperates with the weight of the flap 4' (that is to say so that the flap 4' is caused to close). In this way, the second weight 7' has the effect of increasing the counter-pressure against the current of air before the flap 4' is opened.

Figure 3:
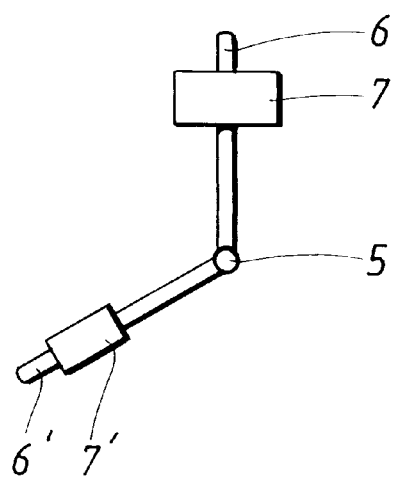
FIG. 3 is a diagrammatic view of another embodiment of the invention.

FIG. 3 shows a diagrammatic representation of a further embodiment of the invention. In this case, the flap 4 is acted upon by two weights 7, 7' which are arranged on two lever arms 6, 6'. The device is otherwise constructed in analogy with what has been described above. The one lever arm 6' can be arranged on the axle 5 in such a way that the one weight 7' and its direction out from the axle 5 correspond to the resultant of what is provided in each position by a weight acting with the flap (that is to say the weight 7'), and a weight acting progressively against the flap.

The invention is not limited to the embodiments which have been mentioned, but can be varied within the scope of the patent claims which follow. For ale, the invention functions for gases other than air which are suitable for different throttle devices where a high degree of penetration of the gas is sought.

Finally, a plurality of weights can be provided for the flap, either on the lever arm or on the flap itself.

I claim:

1. A throttle for achieving a high and virtually constant velocity of inflowing current of gas through a channel, comprising:
   an axle;
   a lever arm;
   a flap which pivots on the axle, wherein at a certain air pressure force exerted by the current of gas, the flap is opened from a position in which the channel is essentially closed; and
   at least one weight arranged on said axle via said lever arm and adjustable alone a direction essentially perpendicular to a longitudinal direction of said axle which rotates together with the flap from a resting position where said flap forms an angle of 30° to 70° in relation to a longitudinal direction of the channel to an open position, wherein the weight delivers a torque to said axle in conjunction with the pivoting of said flap that assists in opening said flap from said resting position to said open position and a resultant torque delivered by said flap and said at least one weight reduces as the flap opens.

2. The throttle of claim 1, characterized in that said weight is arranged so that the torque contributed by said flap and the torque contributed by said weight are proportioned to counterbalance each other when said flap is fully open and said flap closes when said air pressure decreases below a threshold.

3. The throttle of any one of the preceding claims, characterized in that at least one part of the axle protrudes outside the channel, wherein the weight is on that part of the axle which protrudes from the channel.

4. The throttle of any one of claims 1, or 2, characterized in that the axle is arranged essentially at right angles to the longitudinal direction of the channel.

5. The throttle of any one of claims 1, or 2, characterized in that the weight is located essentially above the axle when the flap is in its closed position.

6. The throttle of any one of claims 1, or 2, characterized in that the lever arm is essentially parallel to the flap.

7. A throttle for achieving a high and virtually constant velocity of inflowing current of gas through a channel, comprising:
   an axle, said axle arranged essentially at right angles to the longitudinal direction of the channel;
   a lever arm attached to said axle;
   a flap which pivots on said axle, wherein at a certain pressure force exerted by the current of gas, the flap is opened from a position in which the channel is essentially closed;
   at least one weight arranged on the lever arm characterized in that the weight is located essentially above the axle when the flap is in the closed position and is adjustable along a direction essentially perpendicular to a longitudinal direction of said axle, wherein the weight rotates together with the flap from a resting position where the flap forms an angle of 30° to 70° in relation to the longitudinal direction of the channel to an open position and wherein the weight delivers a torque to the axle in conjunction with the pivoting of the flap that assists in the opening of the flap from said resting position to said open position and a resultant torque delivered by said flap and said weight reduces as the flap opens; and wherein a mass of said weight and a mass of said flap are proportioned so that said flap and said weight counterbalance each other when said flap is fully open and said flap closes when said air pressure decreases below a threshold.

8. The throttle of any one of claims 1, or 2 wherein a mass of said weight and a mass of said flap are proportioned so that said flap and said weight counterbalance each other when said flap is filly open and said flap closes when said air pressure decreases below a threshold.

9. A throttle for achieving a high and virtually constant velocity of inflowing current of gas through a channel, comprising:

an axle;

a first lever arm;

a second lever arm:

a flap which pivots on the axle, wherein at a certain pressure force exerted by the current of gas, the flap is opened from a position in which the channel is essentially closed to an open position;

at least a first weight arranged on said axle via said first lever arm and adjustable along a direction essentially perpendicular to a longitudinal direction of said axle and at least a second weight arranged on said axle via said second lever arm and adjustable along a direction essentially perpendicular to a longitudinal direction of said axle, wherein said first weight rotates together with the flap and said first weight delivers a torque to said axle in conjunction with the pivoting of the flap that assists in the opening of the flap from said position in which the channel is essentially closed to said open position; and said at least a second weight rotates opposing the flap and said second weight delivers a torque to said axle opposing the pivoting of the flap that assists in closing the flap from said open position to said position in which the channel is essentially closed.

10. The throttle device according to claim 9, characterized in that the axle is arranged essentially at right angles to the longitudinal direction of the channel.

11. The throttle device according to claim 3, characterized in that the weight is located essentially above the axle when the flap is in its closed position.

12. The throttle device according to claim 4, characterized in that the weight is located essentially above the axle when the flap is in its closed position.

13. The throttle device according to claim 3, characterized in that the lever arm is essentially parallel to the flap.

14. The throttle device according to claim 4, characterized in that the lever arm is essentially parallel to the flap.

15. The throttle according to claim 9, wherein said flap at rest forms an angle of 30° to 70° in relation to the longitudinal direction of the channel.

16. The throttle according to claim 9, wherein a mass of said first weight and a mass of said second weight and a mass of said flap are proportioned so that said first weight and said second weight and said flap counterbalance each other when said flap is fully open and said flap closes when said air pressure decreases below a threshold.

17. The throttle according to claim 9, wherein said first weight is arranged on said axle via said first lever arm; and wherein said second weight is arranged on said axle via said second lever arm, so that the torque contributed by said flap and the torque contributed by said first weight and said second weight and said flap are proportioned to counterbalance each other when said flap is fully open and said flap closes when said air pressure decreases below a threshold.

18. The throttle according to claim 9, wherein said first weight is located essentially above said axle when said flap is closed and said second weight is located essentially below said axle when said flap is closed.

19. A method for achieving a high and virtually constant velocity of an inflowing current of gas through a channel, comprising:

pivoting a flap from a resting position to an open position;

arranging at least one weight along a direction essentially perpendicular to a longitudinal direction of an axle;

rotating said at least one weight together with said flap, wherein said weight delivers a torque in conjunction with said pivoting of said flap that assists in opening said flap from said resting position to said open position; and reducing a resultant torque delivered by said flap and said weight as said flap opens.

20. The method according to claim 19, further comprising the steps of:

proportioning a mass of said weight and a mass of said flap;

counterbalancing said weight and said flap when said flap is fully open; and closing said flap when said air pressure force decreases below a threshold.

21. The method according to claim 19, wherein said step of pivoting a flap further comprises pivoting the flap from a resting position of 30° to 70° in relation to a longitudinal direction of the channel.

22. A method for achieving a high and virtually constant velocity of an inflowing current of gas through a channel, comprising:

pivoting a flap a resting position to an open position;

arranging at least one first weight along a direction essentially perpendicular to a longitudinal direction of an axle;

arranging at least one second weight along a direction essentially perpendicular to a longitudinal direction of said axle;

rotating said at least one first weight together with said flap, wherein said at least one first weight delivers a torque in conjunction with said pivoting of said flap that assists in opening said flap from said resting position to said open position; and rotating said at least one second weight, wherein said at least one second weight delivers a torque that assists in closing said flap from said open position to said resting position.

23. The method according to claim 22, further comprising the steps of:

proportioning a mass of said at least one first weight and a mass of said at least one second weight and a mass of said flap;

counterbalancing said at least one first weight and at least one second weight and said flap when said flap is fully open; and closing said flap when said air pressure force decreases below a threshold.

24. The method according to claim 22, wherein said step of pivoting a flap further comprises pivoting a flap from a resting position of 30° to 70° in relation to a longitudinal direction of the channel.

* * * * *

UNITED STATES PATENT AND TRADEMARK OFFICE
CERTIFICATE OF CORRECTION

PATENT NO. : 5,983,930
DATED : November 16, 1999
INVENTOR(S) : Nordenberg

It is certified that error appears in the above-identified patent and that said Letters Patent is hereby corrected as shown below:

Column 3, line 67, please change "ale" to --example--;
Column 4, line 17, please change "alone" to --along--; and
Column 5, line 12, please change "filly" to --fully--.

Signed and Sealed this

Twenty-first Day of March, 2000

Q. TODD DICKINSON

Attest:

Attesting Officer

Commissioner of Patents and Trademarks